(12) United States Patent
Rea et al.

(10) Patent No.: US 8,333,050 B2
(45) Date of Patent: Dec. 18, 2012

(54) MACHINE FOR MAKING FILTER BAGS FOR INFUSION PRODUCTS AND WRAPPING THEM IN OUTER ENVELOPES

(75) Inventors: Dario Rea, Monterenzio (IT); Giacomo Noferini, Castenaso (IT); Emanuele Rubbi, Castelguelfo (IT)

(73) Assignee: Ima Flavour S.R.L., Ozzano Emilia (IT)

( * ) Notice: Subject to any disclaimer, the term of this patent is extended or adjusted under 35 U.S.C. 154(b) by 0 days.

(21) Appl. No.: 12/919,055

(22) PCT Filed: Dec. 4, 2009

(86) PCT No.: PCT/IB2009/055519
§ 371 (c)(1),
(2), (4) Date: Aug. 24, 2010

(87) PCT Pub. No.: WO2010/067290
PCT Pub. Date: Jun. 17, 2010

(65) Prior Publication Data
US 2011/0232229 A1    Sep. 29, 2011

(30) Foreign Application Priority Data
Dec. 12, 2008    (IT) .............................. BO2008A0746

(51) Int. Cl.
*B65B 11/06* (2006.01)
(52) U.S. Cl. ............................. 53/134.2; 53/228; 53/232
(58) Field of Classification Search ................. 53/134.2, 53/228, 232–234, 167
See application file for complete search history.

(56) References Cited

U.S. PATENT DOCUMENTS

| | | | | |
|---|---|---|---|---|
| 3,316,686 | A | * | 5/1967 | Welin-Berger ................. 53/413 |
| 3,563,101 | A | | 2/1971 | Kinnicutt, Jr. |
| 3,774,369 | A | * | 11/1973 | Klar ............................ 53/134.2 |
| 3,805,483 | A | * | 4/1974 | Romagnoli ................... 53/134.2 |
| 4,085,568 | A | * | 4/1978 | Focke et al. ..................... 53/234 |
| 4,346,545 | A | * | 8/1982 | Crescenzo et al. ............. 53/234 |
| 4,495,745 | A | * | 1/1985 | Crescenzo et al. ............... 53/77 |
| 4,853,071 | A | * | 8/1989 | Romagnoli ................. 53/134.2 |
| 4,885,896 | A | * | 12/1989 | Romagnoli ..................... 53/116 |
| 5,461,841 | A | * | 10/1995 | Spada et al. .................... 53/234 |
| 5,870,880 | A | * | 2/1999 | Romagnoli ................. 53/134.2 |

(Continued)

FOREIGN PATENT DOCUMENTS

EP    1 173 365 A1    1/2002

(Continued)

*Primary Examiner* — Rinaldi Rada
*Assistant Examiner* — Andrew M Tecco
(74) *Attorney, Agent, or Firm* — Pearne & Gordon LLP

(57) ABSTRACT

A machine for making outer envelopes (101) in which a filter bag (103) for an infusion product is wrapped in an overwrapping (S) comprises: stations for making the filter bags (103), means (106) for moving the filter bag (103) towards a station (107) for wrapping a sheet (S) of overwrapping material around the filter bag (103); and a station (109) for closing longitudinal end edges (S1, S2) and a transversal end edge (S3) of the "U"-wrapped sheet (S) to form an outer envelope (101); the closing station (109) comprises a joining carrousel (110) equipped with a plurality of sealing elements (112) which are movable in rotation with the joining carrousel (110) and designed to receive respective single filter bags (103) with the folded overwrapping sheet (S) and to allow simultaneous closing of the longitudinal edges (S1, S2) and the transversal edge (S3) of the sheet (S).

9 Claims, 11 Drawing Sheets

U.S. PATENT DOCUMENTS

| | | | | |
|---|---|---|---|---|
| 5,893,256 | A | * | 4/1999 | Ghirlandi ..................... 53/134.2 |
| 6,141,944 | A | * | 11/2000 | Spatafora ........................ 53/466 |
| 6,637,175 | B2 | * | 10/2003 | Ghirlandi ........................ 53/413 |
| 6,948,292 | B2 | * | 9/2005 | Romagnoli .................. 53/134.2 |
| 2002/0139087 | A1 | | 10/2002 | Ghirlandi |

FOREIGN PATENT DOCUMENTS

| | | |
|---|---|---|
| WO | 9013692 A1 | 11/1990 |
| WO | 01/62600 A1 | 8/2001 |

* cited by examiner

MACHINE FOR MAKING FILTER BAGS FOR INFUSION PRODUCTS AND WRAPPING THEM IN OUTER ENVELOPES

TECHNICAL FIELD

This invention relates to a machine for making filter bags for infusion products such as tea, coffee, camomile, etc. and wrapping the bags in outer envelopes. The filter bags are single- or double-lobed, covered by an overwrapping sheet which is suitably folded and sealed to form the outer envelope.

BACKGROUND ART

At present, machines for making filter bags wrapped in outer envelopes comprise a plurality of stations, arranged one after another, in which the filter bags are made, each containing a charge of product in one or more lobes of the filter bag.

In particular, the main stations located along an operating direction are the following:
- a first station for feeding filter paper equipped with one or more reels of filter paper webs;
- a second station for feeding single charges of product for infusion onto the filter paper as the latter is fed;
- a third station for filter paper superposing and wrapping or sealing (depending on the type of machine) to form a continuous tube;
- a fourth station for applying a tie string and a tag on one face of the filter paper (the tie string and tag arriving in continuous form from respective feed units, and being separated into individual elements by suitable units);
- a fifth station for cutting into single filter bags according to the type of product; and
- a subsequent filter bag forming station, comprising a stepwise driven carrousel, equipped with a plurality of grippers for gripping a single filter bag which are designed to position the filter bags close to a plurality of stations for completing the filter bag.

The following additional stations may be added, one after another, to this basic line during a packaging step:
- a sixth station for feeding the single filter bags obtained in this way towards
- a seventh station for applying an overwrapping sheet to each filter bag and closing the overwrapping (by heat-sealing) to form an outer envelope;
- an eighth station for inserting the filter bags wrapped in the outer envelopes in suitable containers or boxes.

As indicated, aside from the type of filter bag (single-or double-lobed) and the type of application of the tie string and tag (for which typical prior art solutions are, for example, knotting, metal staple or heat-sealable stamp), the part of the machine of particular interest in this text is the stations which perform the step of overwrapping the filter bags before they are inserted, in groups, in containers or boxes.

The step of packaging the individual filter bags each with their own overwrapping is achieved by means of a sub-station for continuously feeding a web of overwrapping material which is separated into single sheets.

Each sheet is suitably folded over the filter bag and closed on itself by means of a heat-sealing or knurling operation which can be carried out in two different ways: on at least two sides or longitudinal edges of the overwrapping sheet if the sheet has an opening flap folded over a surface of the sheet; or heat-sealing on three sides of the sheet, consisting of two longitudinal edges and one transversal end edge, in the case of a simple overwrapping, that is to say, without a flap.

The machines which perform the heat-sealing operation on the three sides operate, in a first prior art solution, in two steps (see for example patent EP 1173365 by the Applicant) with the above-mentioned stepwise driven carrousel positioning the filter bags close to a wrapping station in which the continuous web which is cut to make the sheet that will form the filter bag overwrapping is fed.

Close to said station, the filter bag is moved radially away from the first carrousel, allowing the overwrapping sheet to be fed between the carrousel and the filter bag, which is again moved towards the carrousel so that the sheet is folded in a "U"-shape over and around the filter bag.

After said folding, the filter bag with the sheet folded in a "U"-shape to form an outer envelope to be sealed is brought to a first, fixed station for sealing the sheet transversal upper flaps, formed by the previous folding, using suitable sealing members configured in a single pair.

At this point each partly sealed outer envelope is released onto a second, mobile station for stepwise rotating sealing equipped with suitable recesses on its circumference which are designed to allow, during its stepwise rotation, positioning of the partly sealed outer envelope opposite a second sealer designed to move towards the partly sealed outer envelope which seals the two longitudinal sides of the overwrapping sheet. The fully sealed outer envelope created in this way is then fed towards the final insertion station.

Alternatively, a second prior art solution involves simultaneous sealing of the three sides of the overwrapping sheet in a single step: in this case the first carrousel, again stepwise driven, can position the filter bag with the overwrapping sheet close to a fixed sealing unit which simultaneously seals the three sides of the outer envelope to be sealed.

There is also a third prior art solution for continuous sealing using rollers, according to which a continuous web of overwrapping sheet, inside which the respective filter bags are already positioned, is intercepted by opposite groups of sealing rollers shaped to obtain the sealing lines along the three sides of the overwrapping sheet.

Another substantially continuous prior art sealing solution involves using one or more sealing units able to move parallel with the feed line of a web or of single overwrapping sheets containing a filter bag. These sealing units follow a substantially circular path in which they move towards and make contact with the sheet. They follow one or more overwrapping sheets for a respective stretch of path in order to seal an outer envelope on three sides. Then they move away from the outer envelope and return to the starting point, ready to begin a new cycle and seal the next outer envelope.

It is known that the machines just described have a predetermined production speed (usually between 300 and 450 outer envelopes per minute depending on the construction geometry of the stations). These speeds can currently guarantee a product—outer envelope of good final quality. The latest generation machines can reach production speeds for the filter bag alone (without overwrapping outer envelope) higher than 450 bags per minute. But such speeds cannot be reached for the outer envelopes because of the limits due, in particular, to the above-mentioned sealing step.

Generally speaking (and after many tests), the step of sealing the edges of the overwrapping sheet is considered effective and providing a good seal if it guarantees a predetermined minimum sealing time, below which it is not possible to go: this sealing time is defined as the time during which the sheet to be heat-sealed actually remains in contact with the sealer.

It should be noticed that in the stepwise sealing solutions with a fixed sealer, not all of the time defined by a step can actually be dedicated to sealing, because part of the step time must be reserved for moving the outer envelope, in particular for inserting the outer envelope to be sealed in the sealer and extracting the sealed outer envelope from the sealer.

Increasing the production speed and, therefore, reducing the times of a single step of the above-mentioned carrousels therefore does not guarantee the minimum sealing time, thus creating the risk of reducing the final quality of the outer envelope.

The same problem exists for continuous sealing, since both the fixed sealing rollers and the moving sealing units which follow the overwrapping webs, due to physical construction limits cannot remain in contact with the overwrapping sheet long enough to guarantee correct sealing.

Therefore, to sum up, although prior art machines are capable of producing more than 450 bare filter bags per minute, the current production of filter bags wrapped in heat-sealed outer envelopes is limited to around 450 units per minute due to the heat-sealing step, with an obvious loss of production capacity.

DISCLOSURE OF THE INVENTION

To overcome this disadvantage, the Applicant has invented and produced a machine for making filter bags for infusion products and wrapping them in outer envelopes which is equipped with a sealing station with structural and operating characteristics suitable for increasing the machine operating speed and therefore the production of filter bags wrapped in sealed outer envelopes, at the same time maintaining a high level of end product quality and without altering the architecture of the machine operating line.

Accordingly, the invention achieves this purpose by providing machine, in particular a machine for making filter bags for infusion products and wrapping them in outer envelopes comprising the technical characteristics described in claim 1.

Preferred embodiments of the invention are covered by the dependent claims.

BRIEF DESCRIPTION OF THE DRAWINGS

The invention is now described with reference to the accompanying drawings, provided by way of example only and without limiting the scope of the invention, in which.

DETAILED DESCRIPTION OF THE PREFERRED EMBODIMENTS OF THE INVENTION

Figure 1:
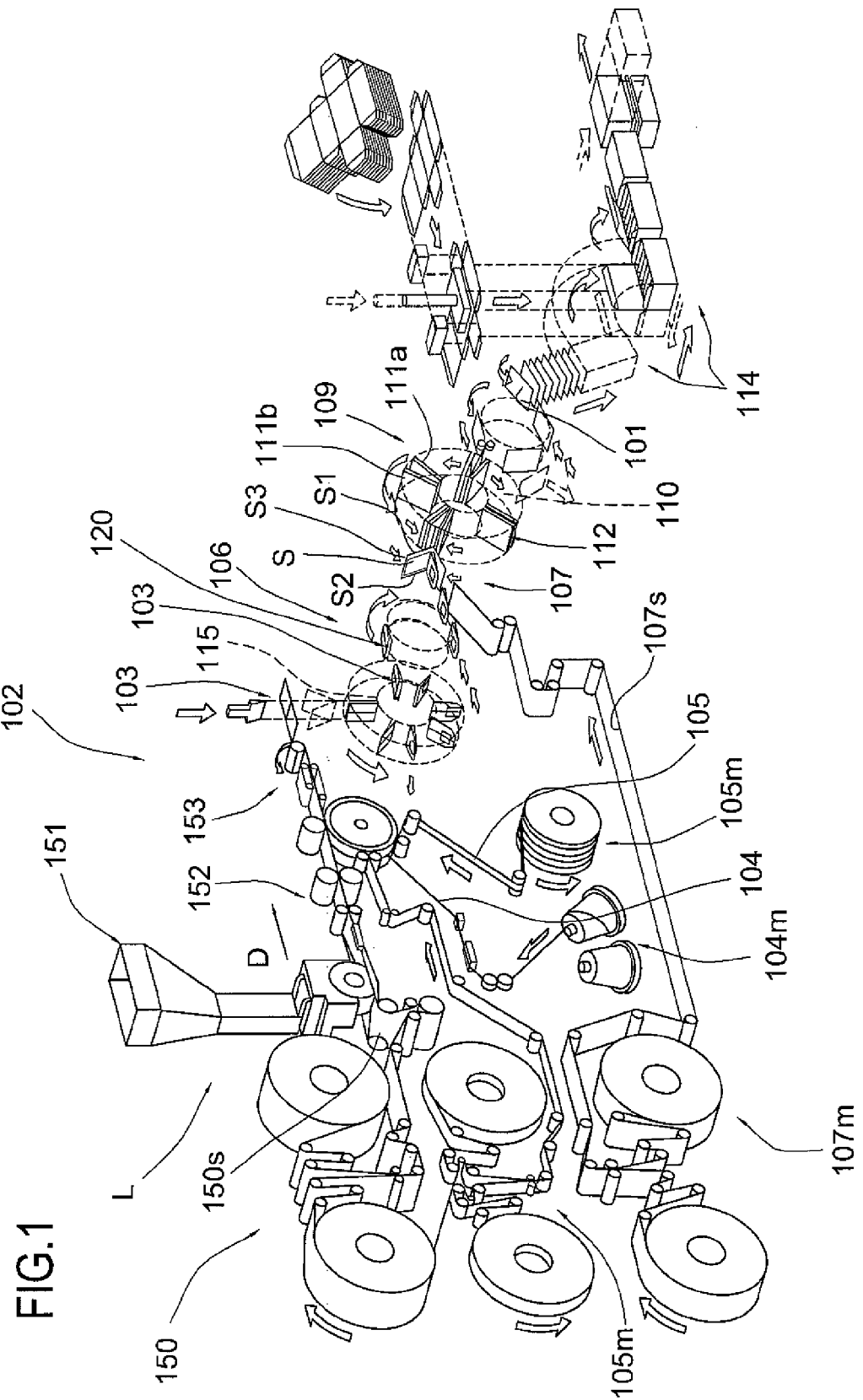
FIG. 1 is a simplified schematic perspective view of a machine according to the invention for making filter bags for infusion products and wrapping them in heat-sealed outer envelopes (BET) with some parts cut away for clarity.
Figure 2:
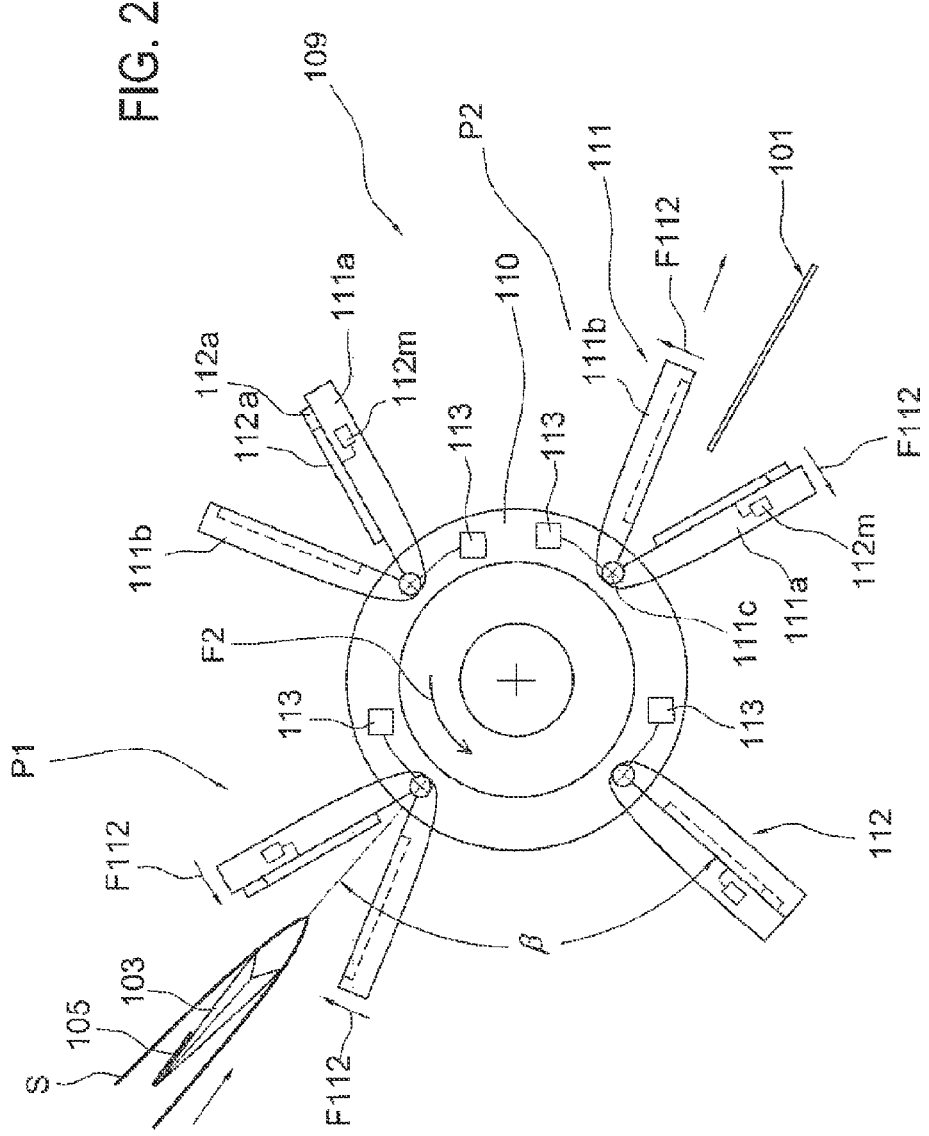
FIG. 2 is a simplified schematic side view of a closing station of the machine of FIG. 1 with some parts cut away for clarity.
Figure 3:
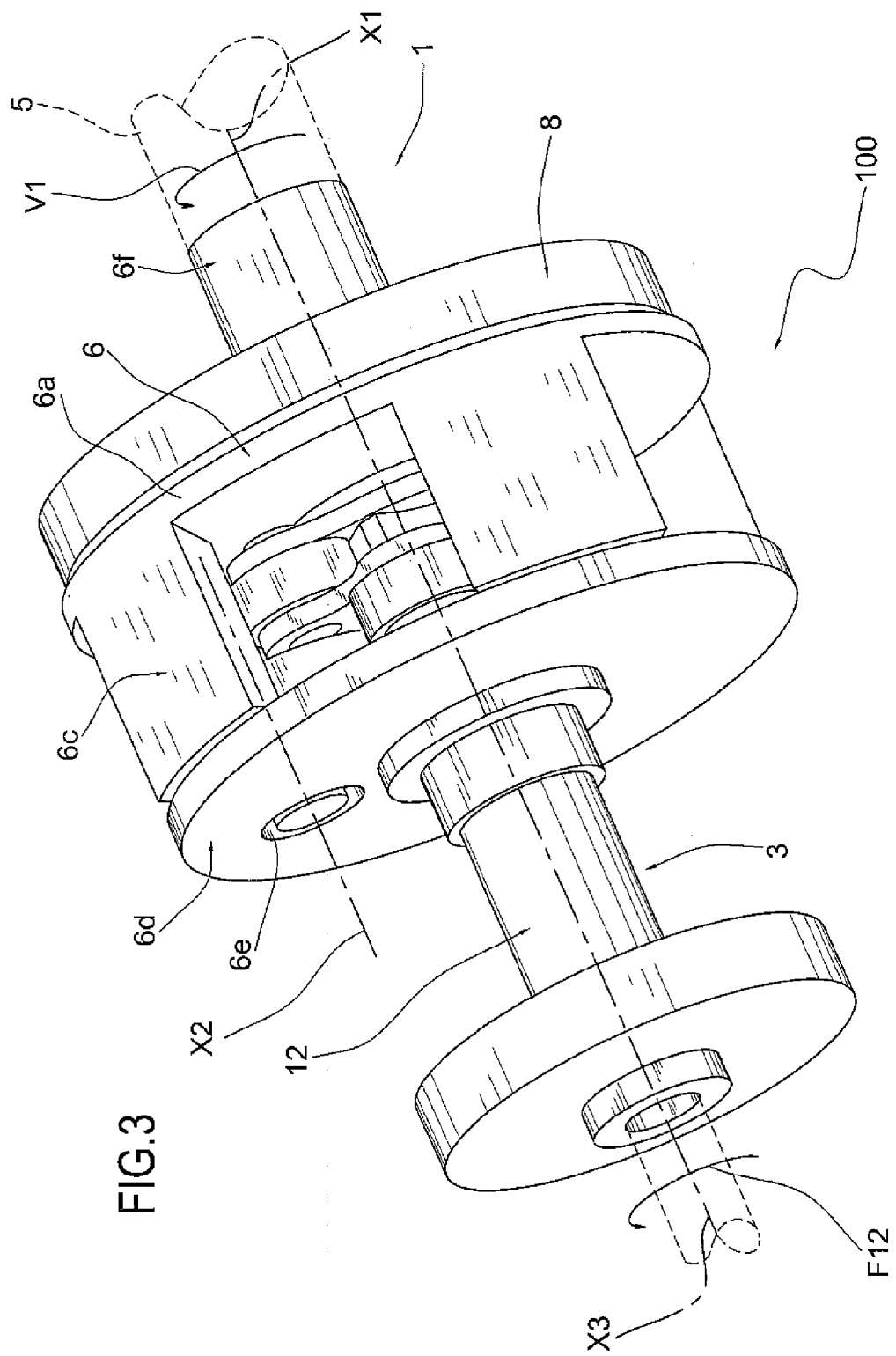
FIG. 3 is a perspective view of a first embodiment of an intermittent drive for moving the closing station of FIG. 2 with some parts cut away for clarity.
Figure 4:
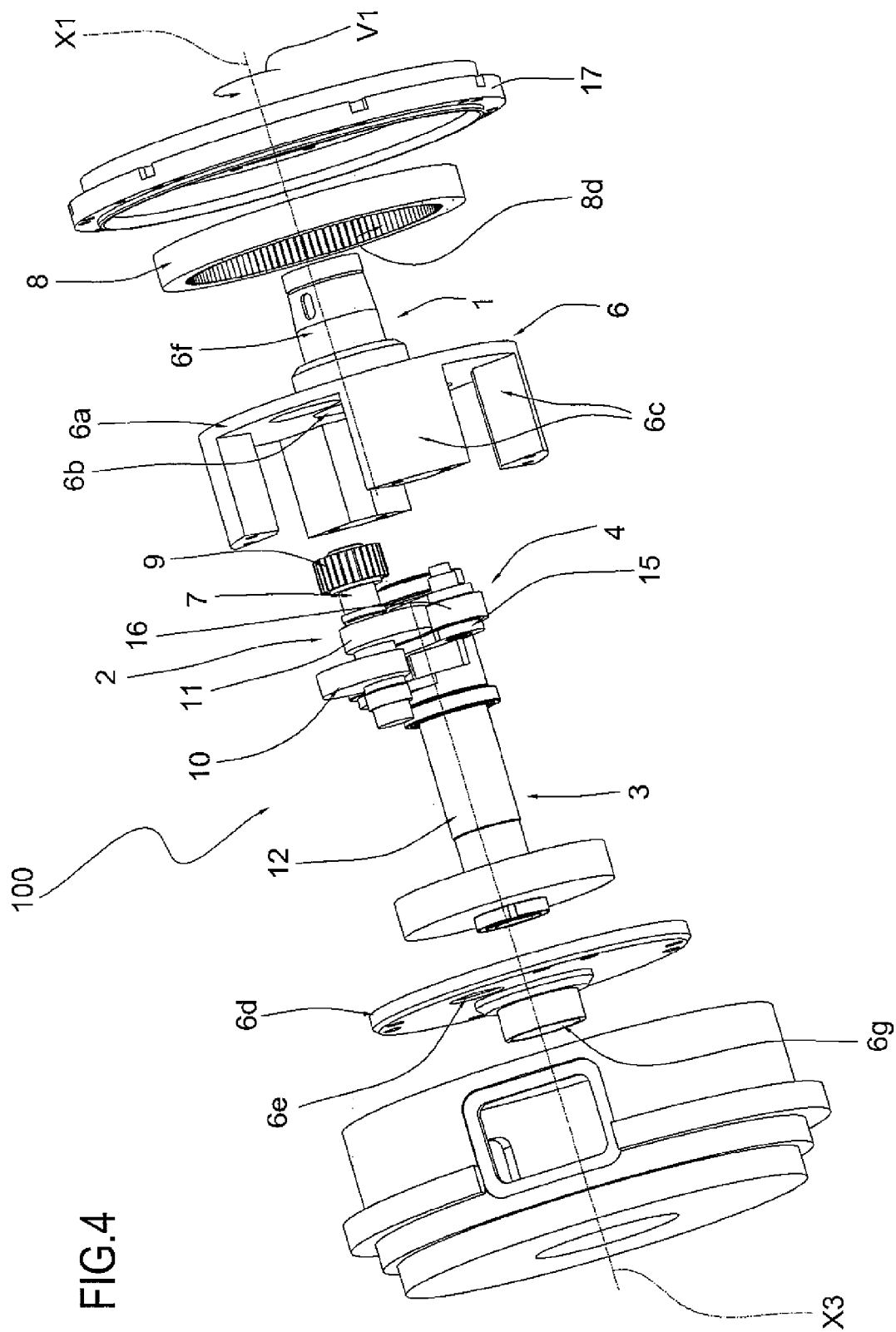
FIG. 4 is an exploded perspective view of the intermittent drive of FIG. 3, with some components cut away for clarity.

With reference to the accompanying drawings, in particular FIGS. 1 and 2, the machine according to the invention, labelled 102 as a whole, is used for making outer envelopes 101 wrapped around filter bags containing infusion products such as tea, coffee, camomile and the like.

The outer envelopes 101 are of the known type and comprise a filter bag 103, of the two-lobed type containing a charge of product, and a tie string 104 joined at one end to a lobe, and a tag 105 joined to the other end of the tie string 104.

The outer envelopes 101 also comprise a closed overwrapping S in which the filter bag 103 is packaged.

The machine 102 comprises a plurality L of stations for making the filter bags 103, which are of the known type and only schematically illustrated, since they are not strictly part of the invention.

Said stations, visible in FIG. 1, may comprise a magazine 150 with filter paper on a reel which is unwound, in a web 150s, along an operating direction D in which it encounters a feed hopper 151 for charges of infusion product; a station 152 for closing the web 150s, both longitudinally and transversally (for example by heat-sealing); a station for applying on a surface of the web 150s the tie string 104 and the tag 105. The tie string 104 and the tag 105 arrive (in continuous form) from respective magazines 104m and 105m.

Figure 11:
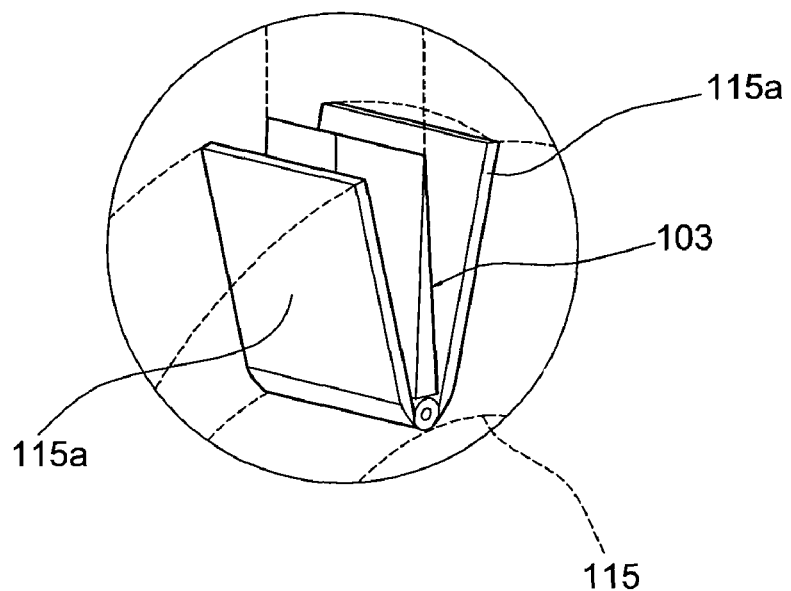
FIG. 11 shows schematically the gripping elements of packaging carrousel 115.

Then the web 150s, already provided with a product charge, tie string 104 and tag 105, reaches a station 153 for cutting the web 150s, then a packaging station, for example comprising a packaging carrousel 115 where, as illustrated in FIG. 1 by way of example it is made into single two-lobed filter bags 103, before passing to filter bag 103 movement means 106. The packaging carrousel 115 is radially equipped (see FIG. 11) with a plurality of gripping elements 115a,115a for the single filter bags 103.

The movement means 106, described in more detail below, pick up the single filter bags 103 and position them in a station 107 for wrapping a flat sheet S of overwrapping material around each filter bag 103. The wrapping station 107 is fed with a continuous web of sheets 107s arriving from a respective magazine 107m. The wrapping station 107 is equipped with members for wrapping the sheet S (of the known type and therefore not illustrated) about its transversal axis to form a "U"-shaped overwrapping around the filter bag 103 with at least two opposite wings between which the filter bag 103 is interposed (the wrapping station 107 is also of the known type and is not described in detail).

After wrapping, the sheet S and the filter bag 103 pass to a station 109 for closing, for example by heat-sealing, the two longitudinal end edges S1, S2 and the transversal end edge S3 of the "U"-wrapped sheet S to form a single outer envelope 101.

Finally, the outer envelope 101 obtained in this way is brought into a station 114 for grouping the outer envelopes 101 and inserting them in suitable containers.

The closing station 109 comprises at least one joining carrousel 110, in particular for sealing, which is motor-driven in such a way that it is synchronised at least with the wrapping station 107.

The joining carrousel 110 is equipped with a plurality of sealing elements 112 having cavities 111 for receiving respective single filter bags 103 with the "U"-folded overwrapping sheet S.

Each of these sealing elements 112 is connected to and able to move by rotating with the joining carrousel 110 and is designed to allow simultaneous closing of the two longitudinal end edges S1 and S2 and the transversal end edge S3 of the sheet S during the passage from the wrapping station 107 to the grouping and inserting station 114.

In the embodiment illustrated, at least the wrapping station 107 and the joining carrousel 110 are stepwise driven and operate in such a way that they are synchronised with each other. In particular, the joining carrousel 110 rotates with a stepwise movement, for example in the direction shown by the arrow F2 in FIG. 2.

Again with reference to FIGS. 1 and 2, each of the sealing elements 112 is divided into two half-parts 111a, 111b projecting radially from the surface of the joining carrousel 110.

At least one of the two half-parts 111a, 111b of each sealing element 112 is hinged at 111c and at a corresponding end which is connected to the joining carrousel 110 allowing the definition of at least:

- a first open pick up or release condition for the outer envelope 101, in which the half-parts 111a, 111b are separated, and
- a second, close joining condition, for example for sealing, in which the half-parts 111a, 111b are in contact with each other. The arrows F112 in FIG. 2 show the directions for opening and closing of the half-parts 111a, 111b.

At least one of the half-parts, for example that labelled 111a, is equipped with sealing profiles 112a, for example linear, covering the corresponding two longitudinal end edges S1, S2 and the transversal end edge S3 of the "U"-folded overwrapping sheet S. These linear profiles 112a are connected to means 112m for keeping the temperature suitable for sealing during machine 102 operation (which are schematically illustrated with a block in FIG. 2).

In addition, each sealing element 112 is controlled by movement members 113, integrated in the joining carrousel 110, and designed to move each sealing element 112 into the open condition and into the sealing condition according to a predetermined sequence, synchronised with the stepwise movement of the joining carrousel 110. In particular, each sealing element 112 is in the open condition close to the wrapping station 107, so that it can receive the open outer envelope 101 (position P1 in FIG. 2) and close to the grouping and inserting station 114 for releasing the closed outer envelope 101 (position P2 in FIG. 2), whilst it is in the closed sealing condition at least during the rotation from position P1 to position P2. Once the sealed outer envelope 101 has been released in position P2, the sealing element 112 rotates to the open condition towards position P1.

The movement members 113 are also schematically illustrated with a block in FIG. 2.

The joining carrousel 110 according to the embodiment in FIGS. 1 and 2 is equipped with four sealing elements 112, arranged at 90° angles to each other. There may be a different number of sealing elements 112, consequently arranged at angles other than 90°.

In contrast, the above-mentioned movement means 106 may comprise, in this embodiment, a rotation carrousel 120, stepwise driven, for rotating the filter bags 103 and allowing their correct positioning relative to the overwrapping sheet S. The rotation carrousel 120 is radially equipped with a plurality of gripping elements (not illustrated for reasons of clarity) for the single filter bags 103.

Therefore, in this embodiment, the packaging carrousel 115 and the joining carrousel 110 are stepwise synchronised and, by way of example only, have a ratio of two to one in the number of respective gripping elements and sealing elements 112 present on each carrousel 115, 110 (that is to say, eight gripping elements and, respectively, four sealing elements 112).

Basically, the joining carrousel 110, for each step performed in a step time, rotates by an angle β which is double the angle covered in one step by the packaging carrousel 115. In other words, the average speed of the joining carrousel 110 is twice that of the packaging carrousel 115.

In general, as already mentioned, only part of the step time corresponds to an actual outer envelope sealing time. It is important to subtract from the step time the time for insertion of the outer envelope to be sealed in the sealing element and the time for releasing the sealed outer envelope.

In contrast, in the joining carrousel 110 disclosed, said actual sealing time is considerably increased and corresponds to two step times, minus the time for insertion of the outer envelope 101 to be sealed at position P1 and the time need to extract the sealed outer envelope 101 at position P2, thus giving an increase in the actual sealing time which is equal to one whole step time. It should be noticed that, once the outer envelope 101 to be sealed has been inserted in the sealing element 112 at position P1, the sealing element 112 remains in the sealing condition until position P2, which it reaches in two step times. The joining carrousel 110 according to the invention therefore allows use of the entire time for moving the outer envelope 101 from the pickup point (position P1) to the release point (position P2) for sealing.

To achieve a high stepwise speed for the joining carrousel 110 described above, significant technical problems had to be solved, caused by the fact that the joining carrousel 110 operates at very high speeds and is very heavy, due to the presence of the sealers on it, which means that the joining carrousel 110 as a whole has high inertia during the stopping and stepwise movement.

Therefore a motion transmission system had to be produced which could guarantee high speeds of rotation for the joining carrousel 110 in the closing station 109 and precise operation on said station.

The motion transmission system is visible in FIGS. 3 to 6, which show a first embodiment of an intermittent drive 100.

The intermittent drive 100 comprises a driving member 1 which rotates continuously and a follower member 3 with intermittent motion according to a variable motion law, which may advantageously comprise a stop step.

The driving member 1 comprises a first, motor-driven shaft 5 (illustrated with a dashed line) defining a first axis X1 of the driving member and cam elements 2 connected to the motor-driven shaft 5 and rotating about the axis X1 of the driving member. The motor-driven shaft 5 is continuously rotated about the axis X1 of the driving member by an external unit of the known type and not illustrated for reasons of clarity, advantageously at a constant speed of rotation (V1).

The follower member 3 comprises a second, driven shaft 12 defining an axis X3 of the driven member and cam follower elements 4, integral with the driven shaft 12. The cam follower elements 4 are joined to the cam elements 2, thus allowing the driven shaft 12 to follow the desired law of motion, including for example even one or more stop steps for the follower member 3 during each operating cycle, defined as the period necessary for the driven shaft 12 to return to the same movement condition, in a position rotated by an angle θ about the axis X3 of the driven member relative to the previous cycle. θ is defined as the ratio of 360° to the number N of operating cycles completed by the follower member 3 during a complete rotation of the driving member 1.

The number of follower member 3 operating cycles during a complete rotation of the motor-driven shaft 5 depends on the cam profile and the gear ratio between the driving member 1 and the follower member 3.

As FIGS. 3 to 6 clearly show, and as described in more detail below, the joining and movement configuration of the cam elements 2 and cam follower elements 4 is such that the driven shaft 12 is coaxial with the motor-driven shaft 5.

In particular, the cam elements 2 and the cam follower elements 4 are joined to each other continuously during the entire operating cycle. In other words, each cam element 2 is always in contact with the respective cam follower element 4 during the entire intermittent drive 100 operating cycle.

In said first embodiment, the cam elements 2 may be of the positive type, that is to say, in continuous contact with the cam follower elements 4 and designed to allow control of the movement and stop (if present) step of the follower member 3 in the operating cycle.

In more technical detail, the driving member 1 comprises (see FIGS. 1 and 2):

the first, motor-driven shaft 5 which is integrally connected to a rotating case 6, which is connected to a first end of a third shaft 7 supporting the cam elements 2 and defining its own longitudinal axis X2;

a toothed guide ring 8, connected to a casing 17 which does not rotate together with the motor-driven shaft 5, located outside the case 6, and having a toothed inner profile 8d rotatably meshed with a pinion 9 which is fitted, for example, on a second end of the third, supporting shaft 7.

It should be noticed that in the embodiment just described the longitudinal axis X2 of the supporting shaft 7 is parallel with the axis X1 of the driving member and the axis X3 of the driven member during each step of supporting shaft 7 rotation about the axis X1 of the driving member.

The case 6 comprises a flange 6f for connecting to the motor-driven shaft 5; a first plate 6; integral with the flange 6f, comprising a suitable through-opening 6b for the passage of the pinion 9 and walls 6c for joining to a second plate 6d opposite the first plate 6a.

The second plate 6d in turn has at least one hole 6e for connecting to the first end of the supporting shaft 7 and a central opening 6g for the passage of the follower member 3.

It should be noticed that the case 6 is extremely compact and at the same time protects the cam elements 2 and the cam follower elements 4.

Figure 5:
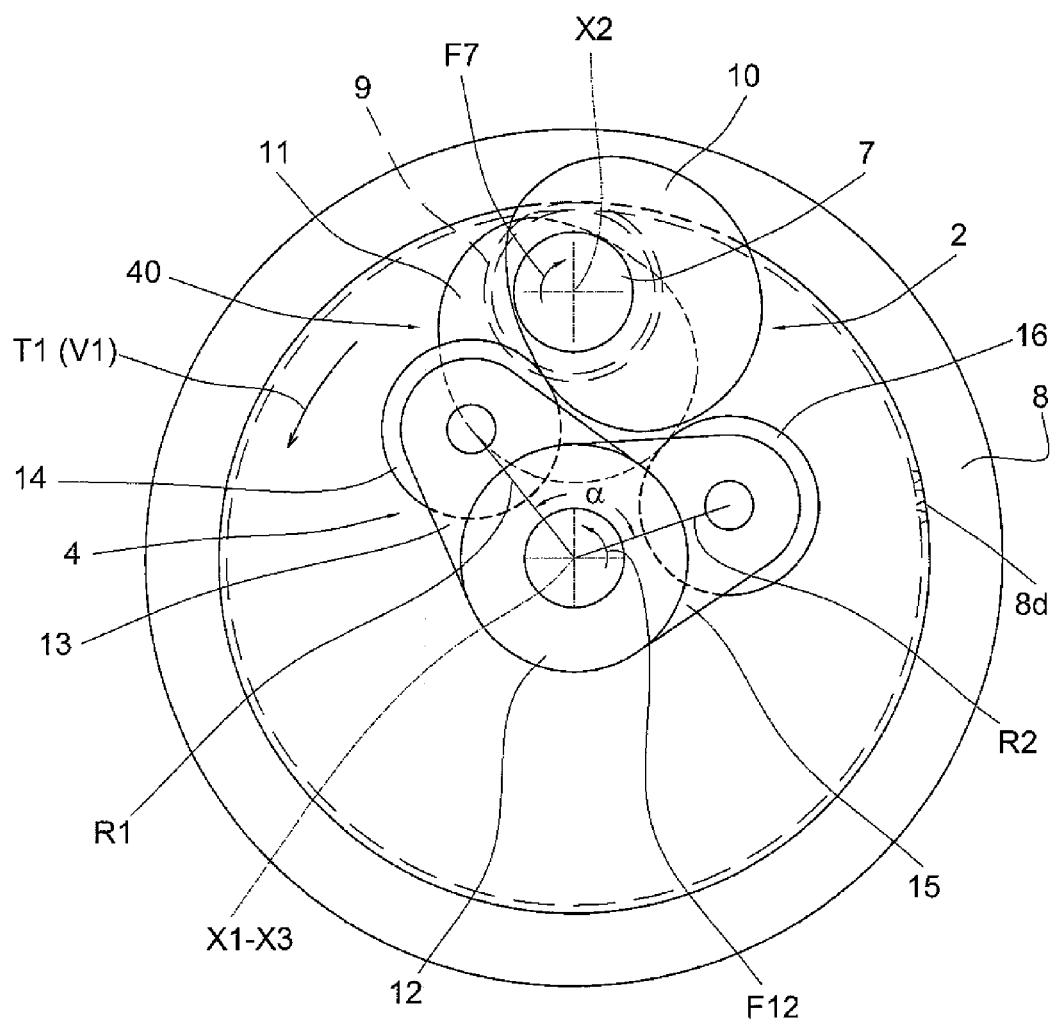
FIGS. 5 and 6 are simplified views normal to a longitudinal axis of the intermittent drive of FIG. 3 respectively in a dynamic step and in a stop step.
Figure 6:
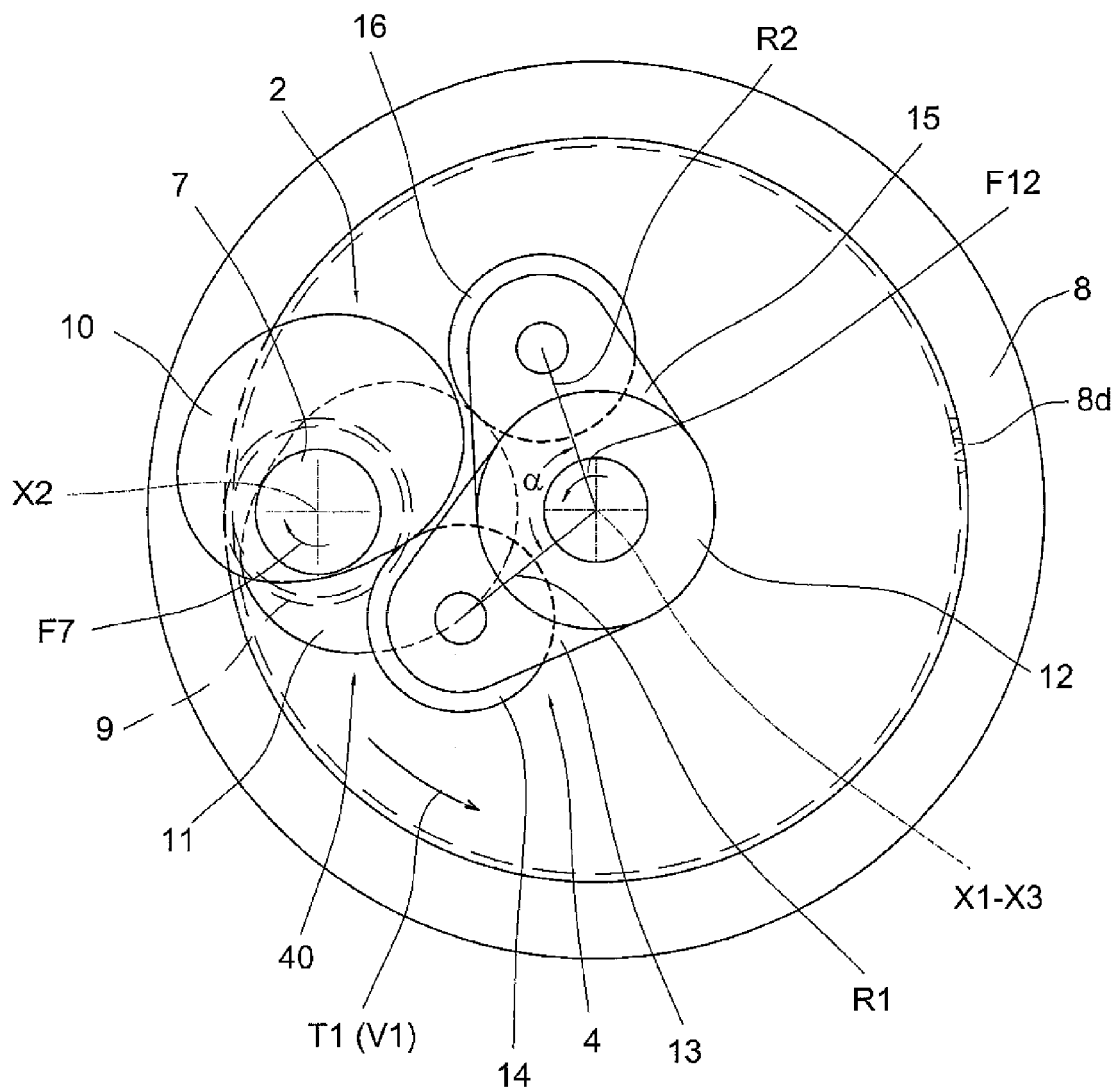

Following rotation of the motor-driven shaft 5, the case 6 is rotated about the axis X1 of the driving member, which in turn, due to the connection between the pinion 9 and the toothed guide ring 8 drives the rotation of the supporting shaft 7, therefore the cam elements 2, along the trajectory T1 about the axis X1 and about itself around its longitudinal axis X2 (see arrow F7 in FIGS. 5 and 6). Basically, as FIGS. 5 and 6 clearly show, the cam elements 2 rotate at a speed of rotation V1 about the axis X1 of the driving member (according to a circular trajectory T1) by an angle θ for each operating cycle and about the longitudinal axis X2 of the supporting shaft 7 by an angle equal to 360°+θ for each operating cycle.

The cam elements 2 may comprise (see in particular FIGS. 5 and 6) an element having a two-lobed shape, or cam 40, integral with the supporting shaft 7.

The cam 40 comprises two lobes, a first lobe 10 and a second lobe 11 with contact profiles or curves which are generally different to each other and in any case depend on the operating requirements. The cam 40 is designed to couple and make contact with the cam follower elements 4.

The first lobe 10 is longitudinally offset relative to the second lobe 11 along the longitudinal axis X2 of the supporting shaft 7.

The cam follower elements 4 comprise:

a first radial arm 13, projecting from the driven shaft 12 and equipped, at a free end, with a cam follower idle roller 14 in contact with the cam elements 2, in particular with the first lobe 10; and a second radial arm 15, projecting from the driven shaft 12 and angularly offset relative to the first arm 13; the second arm 15 also being equipped with a respective cam follower idle roller 16 in contact with the cam elements 2, in particular with the second lobe 11.

The radial arms 13, 15 are integrally connected to each other and define a first radial axis R1 and a second radial axis R2, respectively. The radial axes R1 and R2 form an angle α which may be determined at the design stage according to the stroke and size of the cam 40 lobes 10, 11. The angle α may, for example, be greater than 90°.

The second arm 15 is longitudinally offset relative to the first arm 13 along the axis X3 of the driven member.

Said configuration for contact between the lobes 10 and 11 and the respective offset rollers 14, 16 and the respective opposite profile of the two lobes 10 and 11 allows a dynamic step in which one of the elements 10 or 11 allows the follower member 3 movement step, whilst the other element 11 or 10 generates a controlled opposition to said movement, thus always keeping the driven shaft 12 motion regular and precise, for example the passage of the follower member 3 from a stop to movement and a stop again according to the known operating principle of the desmodromic type for the cam 40 and the cam follower elements 4.

During normal operation of the intermittent drive 100, the lobes 10, 11 are always in contact with the respective cam follower rollers 14, 16. In other words, they are continuously joined during the operating cycle. In particular, during continuous rotation of the motor-driven shaft 5, and therefore of the case 6, about the axis X1 of the driving member anti-clockwise in FIGS. 5 and 6, advantageously the following steps occur one after another:

1) dynamic step (see FIG. 5) in which the lobe 10 applies a force in the anti-clockwise direction (relative to FIG. 5) on the cam follower roller 14, whilst the lobe 11 substantially does not apply any force to the respective cam follower roller 16, despite the fact that it is always in contact with it, causing a controlled rotation of the cam follower elements 4, and therefore of the driven shaft 12, about the axis X3 of the driven member anti-clockwise according to the arrow F12;

2) a stop step (see FIG. 6) in which the lobe 10, still in contact with the respective cam follower roller 14, substantially does not apply any force on it, whilst the lobe 11 prevents the cam follower roller 16 from rotating any further, applying on the latter a force in the clockwise direction (relative to FIG. 3) which causes the cam follower elements 4 and therefore the driven shaft 12 to stop.

Depending on the profile of the lobes 10 and 11 it is also possible to substitute the stop step with an intermittent step, that is to say, a step with a law of motion different to the law of motion of the dynamic step previously described, which may or may not comprise a stop step.

It should be noticed that the masses of the cam follower elements 4 rotating with intermittent motion are extremely low, thus allowing high speeds of rotation of the driven shaft 12 to be achieved with relatively low input torques applied by the motor-driven shaft 5. In contrast, if relatively high input torques were required, for example because particularly high driven shaft speeds are needed, or because significant masses are connected to the latter, the intermittent drive 100 just described maintains high levels of performance and excellent motion transmission. Since the cam and the respective rollers are always in contact with each other, there are no impacts which could damage the individual elements.

Therefore, basically, a continuous rotation of the motor-driven shaft 5 about the axis X1 of the driving member is transmitted by the mechanism described above to the driven shaft 12, causing the latter to rotate with intermittent motion.

Depending on the intermittent drive geometry, in particular the number of teeth on the toothed guide ring 8 and the number of teeth on the pinion 9, which give a gear ratio $\tau_1$, the steps just described may occur during one, more than one or part of a complete rotation of the motor-driven shaft 5. Advantageously, each complete rotation of the motor-driven shaft corresponds to two, four or more operating cycles of the driven shaft 12.

Basically, the gear ratio $\tau_1$ is set in such a way that for each driven shaft 12 operating cycle the supporting shaft 7 (and therefore the cam 40) performs a rotation θ about the axis X1 of the driving member and of 360°+θ about its own longitudinal axis X2, where θ=360°/N.

In other words, each 360°+θ rotation of the pinion 9 about its own longitudinal axis X2 corresponds to a complete operating cycle.

Where $\tau_2$ is an average gear ratio between the driving member 1 and the follower member 3, $\tau_2$ is advantageously set so that it is equal to 1.

FIGS. 7 to 10 show a second embodiment of an intermittent drive which allows significant advantages to be obtained in terms of balance and stability of the entire intermittent drive, in particular at high operating speeds.

An intermittent drive 200 according to said second embodiment comprises components identical or similar to corresponding components of the intermittent drive 100 of FIGS. 3 to 6, which are therefore labelled with the same reference characters.

The intermittent drive 200 comprises a driving member 1 comprising a first, motor-driven shaft (not illustrated for reasons of clarity) forming a first axis X1 of the driving member and two cam elements 2, each integrally connected to a first end of respective supporting shafts 7. Each supporting shaft 7 forms its own longitudinal axis, labelled X2 and X2' in FIGS. 7 to 10. Moreover, each cam element 2 may comprise an element having a two-lobed shape, or a cam 40, comprising a first lobe 10 and a second lobe 11.

The intermittent drive 200 also comprises a follower member 3 with a second, driven shaft 12 which forms a second axis X3 of the driven member and a cam follower unit 201, integral with the driven shaft 12.

The cam follower unit 201 has a four-lobed shape and comprises a first pair of arms 13 and a second pair of arms 15 and respective cam follower rollers 14, 16. The first pair of arms 13 is longitudinally offset relative to the second pair of arms 15 along the axis X3 of the driven member. Basically, the cam follower unit 201 comprises two opposite cam follower elements 4 identical to those illustrated with reference to FIGS. 3 to 6, for a total of four arms, each bearing a cam follower roller 14, 16.

Integrally connected to the second end of each of the supporting shafts 7 there is a pinion 9 designed to mesh with a toothed guide ring 8, connected to a casing identical to the casing 17 of the intermittent drive 100 of FIGS. 3 to 6, but not illustrated for reasons of clarity.

Each cam follower roller 14, 16 engages on the corresponding and separate lobe 10, 11.

Intermittent drive 200 operation is substantially the same as intermittent drive 100 operation, with the two cam elements 2 acting in a coordinated way on the two cam follower elements 4 for performing the desired driven shaft 12 operating cycle, for example substantially like that illustrated with reference to intermittent drive 100, with a dynamic step and an intermittent step, which may advantageously comprise a stop step, or may be entirely substituted by a stop step.

Figure 7:
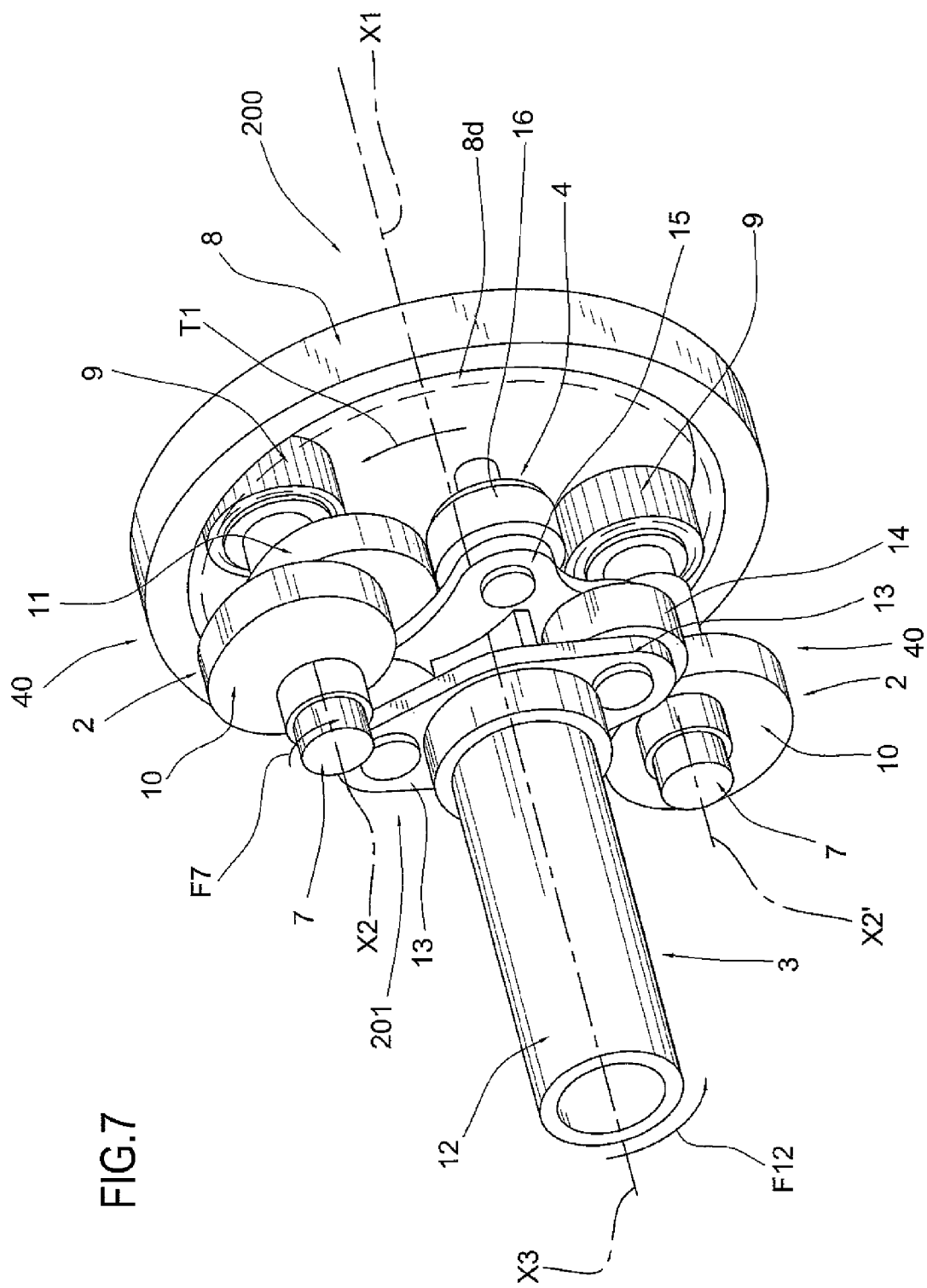
FIGS. 7 and 8 are perspective views of a second embodiment of an intermittent drive, in two different operating positions, respectively for moving a follower member and for stopping the follower member.
Figure 8:
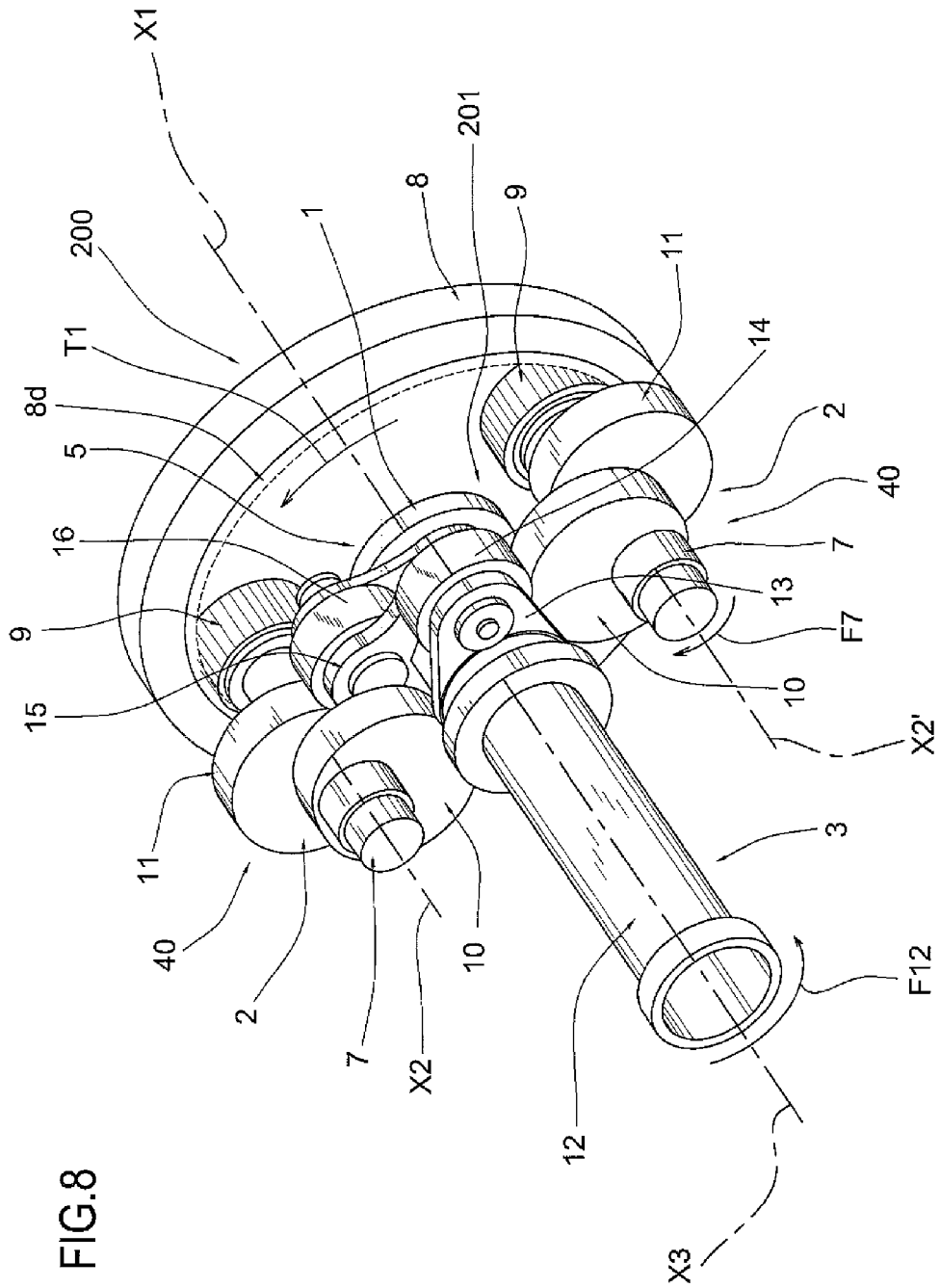
Figure 9:
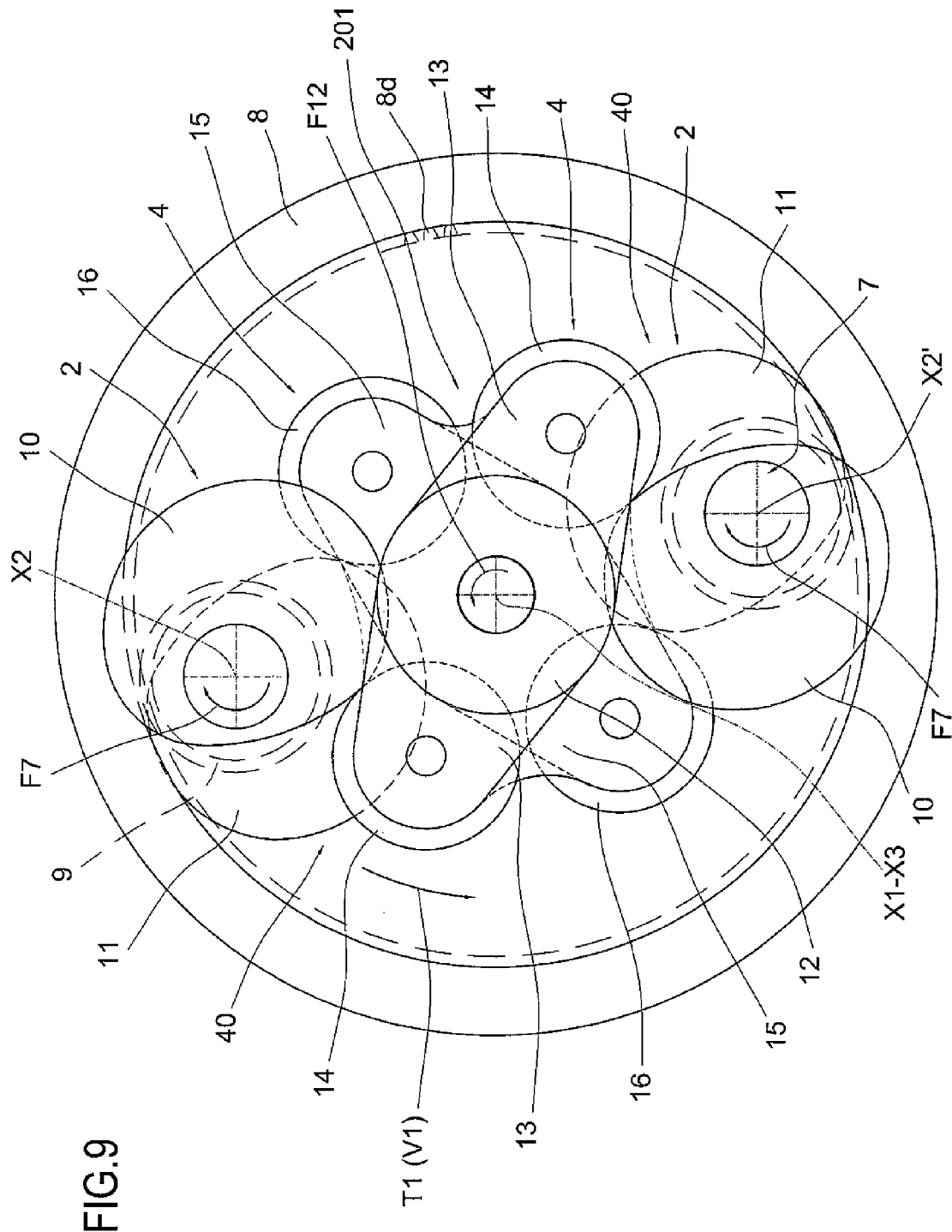
FIGS. 9 and 10 are simplified views normal to a longitudinal axis of the intermittent drive of FIGS. 7 and 8 in operating positions respectively for moving and for stopping the follower member.
Figure 10:
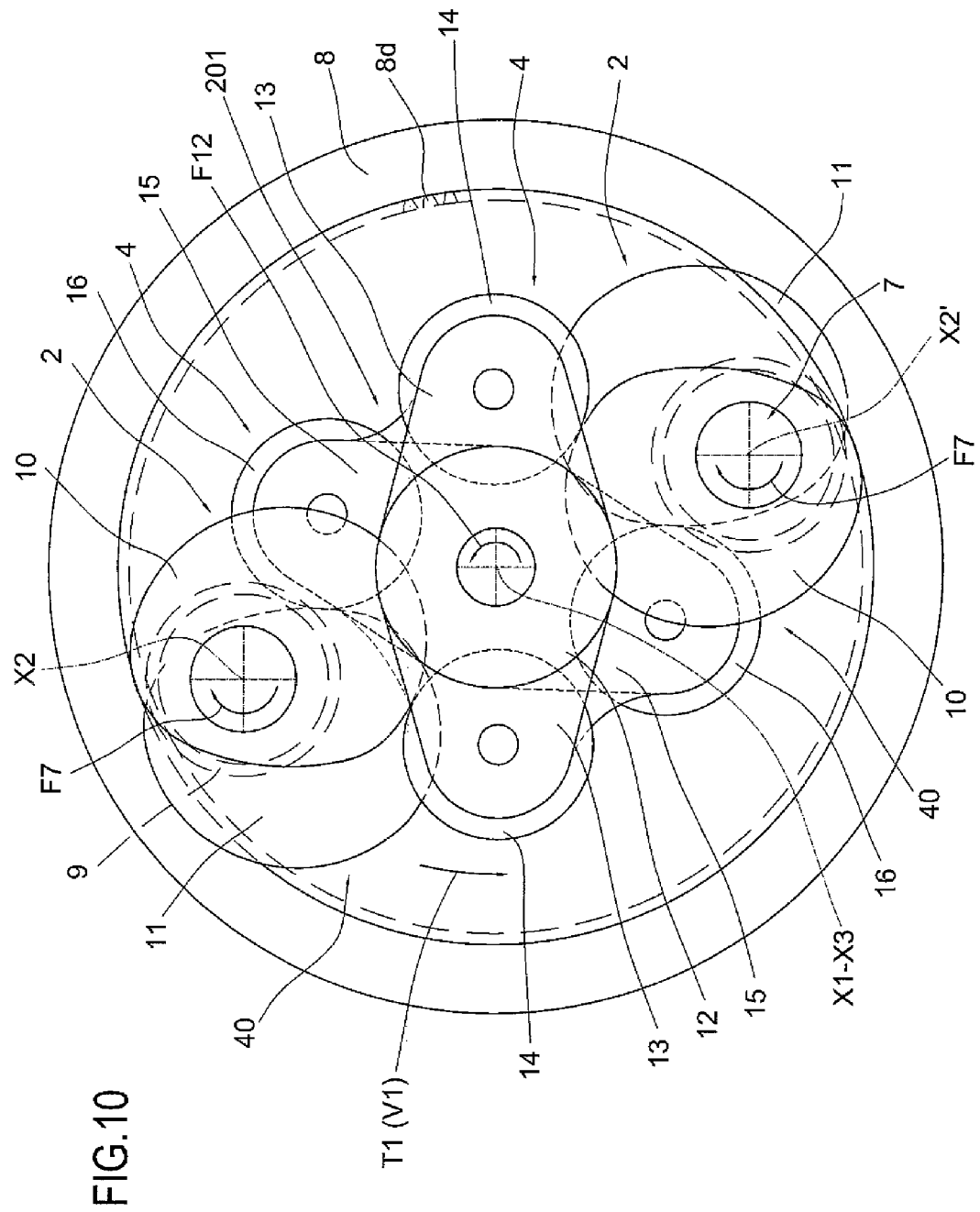

More specifically, FIGS. 9 and 10 show configurations of the intermittent drive of FIGS. 7 and 8 which respectively correspond to a pushing step and a stop step.

Therefore, an intermittent drive structured in this way achieves the preset aims thanks to the construction architecture of the cam and cam follower elements with the aid of the toothed guide ring for moving the cams.

This particular feature allows continuous contact between the cams and the rollers to be obtained, therefore, precise and direct control of the driven shaft cycle, with reduced inertia thanks to the limited masses of the elements with intermittent motion. Basically, only the cam follower elements move with intermittent motion, whilst the cam elements move with continuous motion, at a constant speed of rotation about the axis X1 of the driving member and about the longitudinal axis X2, X2' of the supporting shaft 7.

The presence of the toothed ring allows a high level of cam operating precision, together with good cam stability.

Moreover, the entire unit is compact and the dimensions and weights reduced.

The invention described above is susceptible of industrial application and may be modified and adapted in several ways without thereby departing from the scope of the inventive concept. Moreover, all the details of the invention may be substituted by technically equivalent elements.

In particular, although the invention is described with reference to two-lobed filter bags, it is possible to apply the invention for making one-lobed filter bags wrapped in an outer envelope, by suitably modifying/substituting the stations upstream of the joining carrousel 110 in the known way.

With regard to the joining carrousel and the sealing elements, there may be sealing profiles on both half-parts.

Cold sealing is also possible.

The invention claimed is:

1. A machine for making filter bags (103) for infusion products and wrapping them in outer envelopes (101), the machine (102) comprising:
    a plurality (L) of stations for making filter bags (103), each comprising at least one lobe for containing a charge of product, said plurality (L) of stations extending along an operating direction (D);
    movement devices (106) for moving the filter bag (103), along said operating direction (D), for positioning the filter bag (103) in
    a wrapping station (107) for wrapping a flat sheet (S) of overwrapping material around the filter bag (103) for forming a "U"-shaped wrapper around the filter bag (103) with at least two opposite wings between which the filter bag (103) is interposed; and
    a closing station (109) for closing two longitudinal end edges (S1, S2) and a transversal end edge (S3) of said "U"-wrapped sheet (S) to form a single outer envelope (101),
    said machine (102) being characterised in that said closing station (109) comprises at least one joining carrousel (110) equipped with a plurality of sealing elements (112) for receiving respective single filter bags (103) with said folded overwrapping sheet (S); each sealing element (112) being movable in rotation with said joining carrousel (110) and being designed to allow simultaneous closing of said two longitudinal end edges (S1, S2) and of said transversal end edge (S3) of said sheet (S); each sealing element (112) being divided into two half-parts (111*a*, 111*b*) projecting from said joining carrousel (110); the entirety of at least one of said half-parts (111*a*, 111*b*) being hingedly attached to said joining carrousel (110) so that each sealing element can define an open pickup or release condition for the outer envelope (101) in which the half-parts (111*a*, 111*b*) are separated, and a closed joining condition in which the half-parts (111*a*, 111*b*) are closed together; wherein the components that receive and hold the outer envelope (101) within the sealing element (112) consist of the two half-parts (111*a*, 111*b*); and wherein the two half-parts (111*a*, 111*b*), acting together, are each necessary to hold the outer envelope (101) during the closing operation.

2. The machine according to claim 1, characterised in that said wrapping station (107) is stepwise driven and said joining carrousel (110) allows said sealing elements (112) to move stepwise in such a way that the sealing elements (112) are synchronised with the wrapping station (107).

3. The machine according to claim 1, characterised in that at least one half-part (111*a*, 111*b*) is equipped with sealing profiles (112*a*) matching the corresponding two longitudinal end edges (S1, S2) and the transversal end edge (S3) of a "U"-wrapped overwrapping sheet (S).

4. The machine according to claim 1, characterised in that each sealing element (112) is controlled by movement members (113), integrated in said joining carrousel (110), and designed to move each sealing element (112), between a first position (P1) close to the wrapping station (107) in which the sealing element (112) is in the open pickup condition, and a second position (P2) close to a grouping and inserting station (114) for the outer envelopes (101) in which the sealing element (112) is in the open release condition (P2), each sealing element (112) being in the closed joining condition during a rotation from the wrapping station (107) to the grouping and inserting station (114).

5. The machine according to claim 1, characterised in that the joining carrousel (110) is equipped with at least four sealing elements (112) radially projecting from the joining carrousel (110).

6. The machine according to claim 1, comprising at least one packaging carrousel (115), stepwise driven, radially equipped with a plurality of gripping elements for gripping single filter bags (103), characterised in that said packaging carrousel (115) and said joining carrousel (110) are stepwise synchronised and have a two to one ratio in the number of respective gripping elements and sealing elements (112) present on each packaging carrousel (115) and joining carrousel (110).

7. The machine according to claim 6, characterised in that said joining carrousel (110), for each step completed, rotates by an angle (β) which is double the angle covered in one step by said packaging carrousel (115).

8. The machine according to claim 1, characterised in that said joining carrousel (110) is stepwise driven by means of an intermittent drive (100).

9. The machine according to claim 1, characterised in that said closing station (109) operates by heat-sealing.

* * * * *